United States Patent
Subbarayan et al.

(10) Patent No.: US 9,811,188 B1
(45) Date of Patent: Nov. 7, 2017

(54) DISPLAY STACK

(71) Applicant: Amazon Technologies, Inc., Seattle, WA (US)

(72) Inventors: Srivatsan Subbarayan, Sunnyvale, CA (US); Guneet Sethi, Freemont, CA (US); Anoop Menon, Capitola, CA (US); Shankar Ganapathysubramanian, Cupertino, CA (US); Jorge Ferrer Pont, Menlo Park, CA (US); Weihsin Hou, Fremont, CA (US); Christopher Thomas Li, Mountain View, CA (US); Gregory Turner Witmer, Portola Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 14/581,877

(22) Filed: Dec. 23, 2014

(51) Int. Cl.
| G06F 3/041 | (2006.01) |
| G06F 3/044 | (2006.01) |
| G02F 1/136 | (2006.01) |
| G02F 1/137 | (2006.01) |
| F21V 9/14  | (2006.01) |
| G02F 1/167 | (2006.01) |
| F21V 8/00  | (2006.01) |
| G06F 1/16  | (2006.01) |

(52) U.S. Cl.
CPC .......... *G06F 3/0412* (2013.01); *G02B 6/0011* (2013.01); *G02F 1/167* (2013.01); *G06F 1/169* (2013.01); *G06F 2203/04104* (2013.01); *G06F 2203/04112* (2013.01)

(58) Field of Classification Search
CPC ..... G06F 3/044; G06F 3/0412; G02B 5/3016; H05K 5/02; H05K 5/02
See application file for complete search history.

(56) References Cited

U.S. PATENT DOCUMENTS

| 5,784,054 A * | 7/1998 | Armstrong ............ G06F 3/0436 277/630 |
| 6,751,552 B1 * | 6/2004 | Minelli .................. G01C 21/20 701/454 |
| 2005/0176042 A1 * | 8/2005 | Yu ......................... C12N 9/0004 435/6.16 |
| 2008/0176042 A1 * | 7/2008 | Nashiki ................... G06F 3/044 428/172 |
| 2013/0003268 A1 * | 1/2013 | Cheon ..................... H05K 5/02 361/679.01 |
| 2013/0127776 A1 * | 5/2013 | Guard .................. G06F 3/0412 345/174 |

(Continued)

*Primary Examiner* — Lin Li
(74) *Attorney, Agent, or Firm* — Lee & Hayes, PLLC

(57) ABSTRACT

Described herein are electronic devices that includes a display stack having a cover component atop a lightguide component and a display component below the lightguide component. In some instances, the cover component including an antiglare etching applied to a top surface of a coverglass and a touch pattern applied to a bottom surface of the coverglass. In some cases, an optically clear adhesive layer formed from two types of optically clear adhesive may be located between the cover component and the lightguide component and a ring adhesive may be applied to around an outer edge of the cover component, the optically clear adhesive and the lightguide component.

24 Claims, 7 Drawing Sheets

(56) References Cited

U.S. PATENT DOCUMENTS

| | | | | |
|---|---|---|---|---|
| 2013/0129958 A1* | 5/2013 | Li | .......................... | G02B 27/00 |
| | | | | 428/41.7 |
| 2013/0194671 A1* | 8/2013 | Dai | ....................... | G06F 3/0412 |
| | | | | 359/601 |
| 2015/0004382 A1* | 1/2015 | Menon | .................... | G06F 3/147 |
| | | | | 428/212 |
| 2015/0116609 A1* | 4/2015 | Arita | ................... | G02F 1/13338 |
| | | | | 349/12 |
| 2015/0205033 A1* | 7/2015 | Hong | ....................... | F21V 9/14 |
| | | | | 345/87 |
| 2015/0331292 A1* | 11/2015 | Yang | ................. | G02F 1/133512 |
| | | | | 349/40 |

* cited by examiner

DISPLAY STACK

BACKGROUND

A large and growing population of users is enjoying entertainment through the consumption of digital content, such as music, movies, images, electronic books, and so on. The users employ various devices with electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content. Electronic displays may present various types of information, such as user interfaces, device operational status, digital content items, and the like, depending on the kind and purpose of the associated device. The appearance and quality of a display can affect the user's experience with the electronic device and the content presented thereon. Accordingly, finding ways to enhance user experience and satisfaction continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
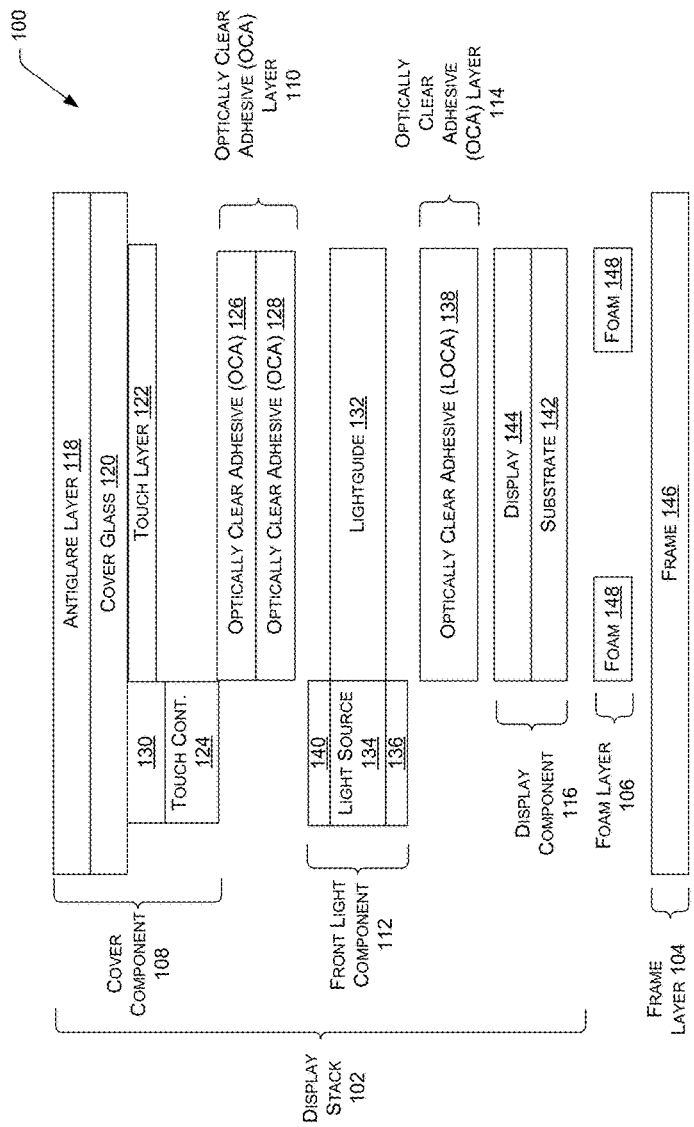
FIG. 1 illustrates an example schematic cross-section of an electronic device.

This disclosure describes, in part, electronic devices that include electronic displays for rendering digital content to one or more users. In particular, this disclosure describes ways to provide a thinner, lighter, and/or cheaper electronic device. In general, a display stack has a number of layers, including a number of substrates and one or more adhesive layers to bond the substrates. For example, a display stack may include a display component that with a number of additional layers or components stacked on top. For instance, a front light component may be stacked atop the display component and a cover component may be stacked atop the front light component. In some instances, the various components of the display stack may be joined or adhered together using one or more layers of optically clear adhesive (OCA).

In one implementation, the cover component includes a coverglass having a top surface exposed to the user and a bottom surface. In some examples, the top surface of the coverglass has an antiglare layer formed from a coating or film. In one particular implementation, the top surface of the coverglass may be etched using a physical or a chemical process to impart antiglare properties to the coverglass. In some embodiments, use of etching to impart antiglare properties to the coverglass may eliminate the need for a bezel around the exterior surface of the display, as well as provide improved durability and resistance to damage (for example, in some instances antiglare films may peel or separate from the coverglass). In one example, the top surface of the coverglass may also have other properties, such as antireflective properties, anti-smudging or anti-fingerprinting properties, and/or anti-cracking properties.

In some implementations, the coverglass may have a touch layer or touch pattern applied to the bottom surface to form a display capable of receiving inputs, as well as displaying content. In some cases, the touch layer or touch pattern may be formed from traces of indium tin oxide (ITO), copper, printed ink or the like. For example, traces of ITO may be deposited or patterned onto the bottom surface of the coverglass, a conductive ink may be printed on the bottom surface of the coverglass, or a pre-formed metal mesh technology or wiring (e.g., silver nanowires or carbon nanotubes) may be adhered or laminated to the bottom surface of the coverglass.

In some examples, a touch sensing layer capable of detecting the proximity and location of an object placed adjacent to, substantially adjacent to, or touching the top surface of the display may be part of the display stack. In some particular implementations, a single layer multi-touch pattern may be utilized. By utilizing a single layer touch pattern in lieu of a multi-layer touch pattern, the touch pattern may be applied to a surface of the coverglass without the need for additional substrates.

In some implementations, the cover component includes a black mask arranged beneath at least a portion of the coverglass. For example, black ink or a black tape may be applied to selected portions or locations of the underside of the coverglass and arranged to prevent errant light from reflecting off various components the display stack. In some instances, the black mask may also be utilized to hide the various component of the display stack, such as the touch controller, touch flex, and/or a light source (e.g., one or more light-emitting diodes (LEDs)) from the view of a user. In some implementations, the black mask may have two layers formed by applying two layers of black ink, two layers of black tape, or one layer of black ink and one layer of black tape to the bottom surface of the coverglass. By utilizing a two layer black mask, the black mask provides improved light obstruction, as well as improved durability with regards to the touch sensor, as will be described in more detail below with respect to FIG. 3.

In addition, in some examples, a frame of the electronic device may attach to portions of the bottom surface of the cover component or subcomponents thereof (e.g. the coverglass, the antiglare layer, the touch layer, etc.). For example, the coverglass may be dimensioned to extend beyond at least some of the components of the display stack below to the bottom of the coverglass. This "lip" or overhang may be configured to be attached to the frame of the electronic device by bonding or mechanical fixation. The frame, in some examples, may be configured to disposed around at least a portion of the display stack below the attachment. FIGS. 1-5 illustrate such examples.

In some examples, the front light component includes a light source and a lightguide. The lightguide may include a substrate formed from a transparent thermoplastic (such as PMMA), a layer of lacquer and multiple grating elements that function to propagate light from the light source towards the top surface of the display stack, thus illuminating the content presented on the display. For example, the lightguide may be formed by applying a layer of lacquer to the substrate to create the grating elements of the lightguide, the grating elements may be embossed to the layer of lacquer, and the lightguide may be ultra-violet (UV)-cured. In one particular implementation, the grating elements are formed by applying the lacquer to the substrate in a manner consistent to form a positive relief.

In some implementations, the light source may be connected to a flexible printed circuit (FPC) to control the amount and volume of light generated. The LEDs selected for inclusion in the light source may have a color that is optimized for the type of display being used. For instance, multiple different color temperature LEDs having particular color ratios there between may be selected to ensure a proper color from the collection of LEDs when lighting the display. Furthermore, the color of the LEDs may be tuned over time to compensate for changes in the lightguide, as well based on other factors, such as the aging of the LEDs, the environment that the device is indented for, among others. In one particular implementation, the light source may include six LEDs utilized in combination.

In general, the lightguide is surrounded by two layers of OCA to prevent errant light from escaping the lightguide in an undesirable manner. The first OCA layer may be formed from two types of OCA: a first type of OCA having predetermined ultra-violet (UV) properties and the second type having predetermined refractive properties. In various implementations, the particular UV properties may be tailored or selected based on the type and characteristics of the component of the display stack and the refractive properties may be tailored or selected based on the type and characteristics of the front light component (e.g., the light source and/or the lightguide). For example, the first type of OCA may have a luminous transmittance of 90% or greater above 400 nanometer (nm) wavelengths, 5% or less below 300 nm wavelength, and between 5% and 90% between 300 and 400 nm wavelength. In one particular example, the luminous transmittance of the first type of OCA may be zero percent below 380 nm wavelength and greater than 90% above 400 nm wavelength. In another example, the refractive index for the second OCA may be in a range from about 1.3 to about 1.51. In another example, the refractive index of the second OCA may be in the range of about 1.39 to 1.45. In one particular example, the refractive index of the second OCA may be about 1.41.

In some implementations, the first type of the OCA may be an acrylic OCA having a UV cut and the second type of OCA may be a silicone OCA having specific refractive indexes. In one particular example, the OCA layer is formed by contacting an acrylic OCA film to a silicone OCA film and UV-curing or hardening. In another particular example, the OCA layer is formed by applying a liquid OCA (LOCA) to the underside of an OCA film or a solid OCA (SOCA). By substituting a LOCA for one of the OCA films, the number of defects and steps associated with the manufacturing process of the display stack may be reduced, resulting in a cheaper higher quality display. For example, when a LOCA is utilized, the first OCA layer may no longer need to undergo the auto glazing process to shrink or remove air gaps within the OCA layer, as the LOCA is better able to fill the air gaps between the two types of OCA.

The second OCA layer may be formed from primarily from silicone OCA having the predetermined refractive index. In some examples, the second layer of OCA may be formed by die-cutting a SOCA film to match the length and width of the lightguide and UV-curing or hardening around the corners and/or the portion of the perimeter. Thereafter, the remaining OCA may be UV-cured. In other examples, a liquid silicone OCA may be placed near a center of the display stack and pressed outwards towards a perimeter of the display stack while UV curing.

In some implementations, the display component may include a reflective display, such as an electronic paper display, a reflective liquid crystal display (LCD), or the like. Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other rendered images even when very little or no power is supplied to the display. Some examples of the display component that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices, the display component may include an active display such as a LCD, a plasma display, a LED display, an organic light emitting diode (OLED) display, and so forth. Accordingly, implementations herein are not limited to any particular display technology.

In an illustrative implementation, the frame may comprise a plurality of pieces. In some examples, the frame may include one or more portions that are disposed below the display stack. The portion of the frame disposed below the display stack may include a top surface (surface closest to the display stack) that is substantially parallel to the bottom surface of the display stack. In some implementations, an air gap may be formed between the bottom surface of the display stack and the top surface of the portion of the frame disposed beneath the display stack. In some examples, a foam layer may be disposed in portions of the aforementioned air gap and may include one or more foam components. The foam components may be compressed between the display stack and the frame such that a pressure is exerted on the bottom of the display stack. In some examples, the pressure exerted on the bottom of the display stack may reduce delamination of the layers of the display stack. Example implementations including such a foam layer are illustrated in FIGS. 1-5.

FIG. 1 illustrates a first example of a schematic cross-section of an electronic device 100. The schematic cross-section of the electronic device 100 includes a display stack 102, a frame layer 104 and a foam layer 106 taken along a line from the front of the electronic device 100 to the back of the device 100. More particularly, the display stack 102 includes individual layers of a cover component 108, OCA layer 114, front light component 112, OCA layer 114, and display component 116. In the illustrated example, the cover component 108 includes an antiglare layer 118 applied to a top surface of a coverglass 120 and a touch layer 122 applied to a bottom surface of the coverglass 120. In some cases, the touch layer 122 may also be electronically coupled to touch controller 124, for example, directly or via a flexible circuit (not shown) to from a touch sensor or touch enabled display capable of both presenting content and receiving user inputs related to the presented content.

In general, the coverglass 120 may be configured to protect the display from damage, such as scratching, chipping, peeling, as well as to provide rigidity and stiffness to the overall device 100 (e.g., to prevent the electronic device 100 from bending or deforming when held). Thus, the coverglass 120 may be configured to run the entire width and depth of the electronic device 100. In some cases, the coverglass 120 may have a hardness rating that is resistant to a 9H pencil or greater, while in other cases, the coverglass 120 may have a hardness rating between 3H pencil and 9H pencil. In general, the coverglass 120 may be manufactured to be less than 1 millimeter (mm) thick and, in some implementations, may be in the range of 0.5 mm to 0.7 mm (e.g. 550 micrometers (um)). In some examples, the coverglass 120 may be formed from a substantially optically clear glass. In other examples, the coverglass 120 may be formed from a substantially optically clear plastic.

The antiglare layer 118 may be formed by applying an antiglare coating or film to a top surface of the coverglass 120. For example, the top surface of the coverglass 120 may be coated or dipped in the antiglare coating which may be cooled or UV-cured. In other examples, an antiglare film may be adhered to the top surface of the coverglass 120, for instance, using an OCA, LOCA, or SOCA. In other implementations, the outer antiglare layer 118 may be selectively etched into the top surface of the coverglass 120. In one example, the antiglare etching may be formed by applying a chemical spray or bath to the top surface of the coverglass 120. In some cases, the antiglare layer 118 may be formed to include additional proprieties such as antireflective properties, anti-smudging or anti-fingerprinting properties, and/or anti-cracking properties.

In general, a touch sensor includes a touch pattern (e.g., rows and columns in a grid or diamond shape) and a touch controller 124. However, unlike traditional touch sensors that typically include a touch component located directly atop the display component 116, the touch sensor described herein, may include a touch layer 122 applied to the coverglass 120 that forms part of the cover component 108. In some particular implementations, the touch layer 122 may be a single layer multi-touch pattern that may be traced upon a single side of a substrate, such as the coverglass 120.

The touch layer 122 may include traces made from ITO, printed ink, metal mesh technologies, or the like applied to a bottom surface of the coverglass 120. For example, traces of ITO may be deposited or patterned (e.g., to form a diamond or grid) onto the bottom surface of the coverglass 120 using physical vapor deposition, electron beam evaporation, or sputter deposition techniques among others. In other examples, a conductive ink may be printed on the bottom surface of the coverglass 120 or a pre-formed metal mesh technology or wiring (e.g., silver nanowires or carbon nanotubes) may be adhered or laminated to the bottom surface of the coverglass 120 to form the touch layer 122. Furthermore, in some instances, the touch layer 122 may include a transparent conductor other than, or in addition to those described above.

In some implementations, to protect the touch layer 122 additional dielectric materials may be incorporated into the antiglare layer 118 or the coverglass 120 above the touch layer 122. For example, an acrylic material may reside atop the coverglass 120 for protection, with this a color of this acrylic layer being tuned to ensure that a resulting color of the display stack 102 viewed by a user is correct. The antiglare layer 118 may provide additional protection for the touch layer 122, for example, in the form an antiglare etching, coating, or film and having antiglare proprieties, antireflective properties, anti-smudging or anti-fingerprinting properties, and/or anti-cracking properties. Furthermore, the touch layer 122 may be filled or surrounded by an OCA (such as, OCA 126 or 128 of OCA layer 110) when joined with the front light component 112, which substantially eliminates the opportunity for air gaps or partial bubbles to form around or near the material used to from the touch layer 122 improving the overall efficacy and accuracy of the resulting touch sensor.

In some implementations, the cover component 108 includes at least one black mask 130 arranged beneath at least a portion of the coverglass 120. For example, black ink or a black tape may be applied to selected portions or locations of the underside of the coverglass 120 and arranged to prevent errant light from traveling through the coverglass 120 at the selected locations. In some particular examples, a pattern or image may be cut from the black mask 130 such that light may escape to the surface of the display, for example, to illuminate one or more control images or areas located in the boarder of the display to a user.

The front light component 112 generally includes a lightguide 132 connected to a light source 134. The lightguide 132 may include a substrate (not shown) formed from a transparent thermoplastic (such as PMMA), a layer of lacquer and multiple grating elements that function to propagate light from the light source 134 towards the top surface of the display stack 102, thus illuminating the content presented on the display. For example, the lightguide 132 may be formed by applying a layer of lacquer to the substrate to create the grating elements of the lightguide 132, the grating elements may be embossed to the layer of lacquer to form a positive or negative relief and the lightguide 132 may be UV-cured. Alternatively, the substrate of the lightguide 132 and the grating elements may be manufactured as a single element, such as via an injection molding process. In some instances, the UV lacquer is made of a cross-linked, tri-functional polymer material that co-polymerizes to a plastic solid when exposed to a high-intensity UV light source.

In some implementations, the light source 134 may be connected to a flexible printed circuit (FPC) 136 to control the amount and volume of light generated. In some instances, the light source 134 (e.g., one or more LEDs) may connected to the FPC 136 via one of the OCA layers 110 or 114. For example, the FPC 136 may be connected to the light source 134 via a strip of SOCA or the like. The FPC 136 may also be connected to the lightguide 132 via the OCA layers 110 and 114. In some instances, the FPC 136 may include a light-diffusing reflective coating (e.g., in the form of a white matte finish), which may help to diffuse and reflect light from the light source 134 and, hence, increase the uniformity of the light across the front of the display screen.

The layers of OCA 110 and 114 above and below the lightguide 216 help maintain the light generated by the light source 134 within the lightguide 132, as well as to join the cover component 108 and the display component 116 with the front light component 112. In general, the OCA layers 110 is arranged atop the front light component 112 and the OCA layer 114 is arranged beneath the front light component 112.

As illustrated, the OCA layer 110 may be formed from two types or layers of OCA, OCA 126 and OCA 128. The OCA 126 may have predetermined UV properties and the OCA 128 (for example, a luminous transmittance percentage of zero below 350 nm wavelength and above 90% over and 400 nm wavelength) may have predetermined refractive index (for example, in the range of 1.39 to 1.45). In various implementations, the particular UV properties may be tailored or selected based on the type and characteristics of the component of the display stack and the refractive properties may be tailored or selected based on the type and characteristics of the front light component 112 (e.g., the light source 134 and/or the lightguide 132). In some implementations, the OCA 126 may be an acrylic OCA having a UV cut and the OCA 128 may be a silicone OCA having specific refractive indexes. In one particular example, the OCA layer 110 may be formed by contacting an acrylic OCA film 126 to a silicone OCA film 128 and UV-curing or hardening. By utilizing both an acrylic OCA and a silicone OCA to form the OCA layer 110, the OCA layer 110 may be configured to have a desired UV cut and refractive index.

The OCA layer 114 may be formed from a single layer of silicone LOCA 138 having the predetermined refractive index. As one example, the LOCA 138 may comprise Loctite® 5192™, an optically transparent UV-curable silicone-based adhesive available from Henkel AG & Co. KGaA of Düsseldorf, Germany. In some instances, the LOCA 138 may include a photoinitiator to facilitate UV curing. Examples of photoinitiators include cationic photoinitiators such as organic iodonium or sulfonium salts. The LOCA 138 may be applied to a surface such a by rolling using a wet coating method or other suitable technique, followed by UV curing (e.g., using a fusion lamp).

In addition, to the OCA layers 110 and 114, a white tape 140 or other type of light-diffusing reflective coating may be laid along a perimeter of the lightguide 132, which again may help to diffuse light from the light source 134 and increase the uniformity of the light from the light source 134. Although shown as being attached to the perimeter of the OCA layer 110, the white tape 140 or other type of light-diffusing reflective coating may be further laid along other elements of the display stack 102, such as the lightguide 132.

In the illustrated example, the front light component 112 resides atop the display component 116, which includes a substrate 142 and a display 144. The display 144 may be may a reflective display, such as bi-stable LCDs, micro MEMS displays, such as interferometric modulator displays, cholesteric displays, electrophoretic displays, electrofluidic pixel displays, electrowetting displays, photonic ink displays, gyricon displays, and the like. In other implementations, or for other types of electronic devices, the display component may include an active display such as a LCD, a plasma display, a LED display, and/or OLED display, and so forth. Accordingly, implementations herein are not limited to any particular display technology.

In some instances, the display 144 may include a front plane laminate (FPL) that includes e-ink capsules, as well as the fluid in which the capsules move up or down in as described above with reference to electronic-paper displays. In some examples, the display 144 may include a plastic film structure onto which the e-ink is coated using a roll-to-roll process. Thereafter, a conductive transparent electrode plastic film may be combined with an adhesive layer and a release sheet to form one implementation of the FPL. As another example, the FPL may include a plurality of pixel elements (not shown), each containing liquid subject to electrowetting activation. For example, voltage may be applied to individual pixel elements to modify the surface tension of the liquid and thereby change the appearance of the pixel element.

The frame layer 104 may be disposed below the substrate 142 of the display stack 102. More particularly, portions of the frame 146 may be disposed with an upper surface of the frame 146 facing the lower surface of the substrate 138. The frame 146 may be constructed from metal, plastic, and/or other suitable materials.

A void may present between the surfaces and the foam layer 106 may be disposed in this void between the display stack 102 and the frame layer 104. More particularly, one or more pieces of foam 148 may be disposed in the void and compressed between the upper surface of the frame 146 and the lower surface of the substrate 138. In some examples, a single piece of foam 148 may fill the space between the upper surface of the frame 146 facing the lower surface of the substrate 138 or some portion thereof. For example, a sheet of foam may be disposed to fill the space. In other examples, multiple pieces of foam 148 may disposed at respective locations in the void. For example, a piece of foam 148 may be disposed between each corner of the substrate 138 and the frame 146. In another example, strips of foam may be disposed between the edges of the substrate 138 and the frame 146 (e.g. two centimeter wide strips of foam with outer edges along the outer edges of the substrate 138). In some examples, the foam 148 may be affixed to one or both of the upper surface of the frame 146 and the lower surface of the substrate 138 (e.g. by adhesive) or may be held in position by friction after being compressed between the frame 146 and substrate 138.

In some examples, the foam 148 may comprise one of Sekisui WF006 made by Sekisui Chemical Co., Ltd., Iwatani ISR-ACF, ISR-ACF-THF and ISR-TUF-RP made by Iwatani Corporation, Korel® K10-SS made by Saint Gobain Performance Plastics Corporation, and Poron® 4701-15-06021-90P made by Rogers Corporation. The foam 148 may have a thickness from 50 microns to 500 microns. Under some embodiments, the foam 148 may comprise a foam material, which may comprise acrylic, urethane, polyethylene, polypropylene, and the like. A foam material may comprise a cellular membrane structure with voids and may be closed cell, semi-closed cell, or open cell. Open cell is a type of foam where the tiny cells are not completely closed. Open cell may be less expensive because it uses fewer chemicals. Open cell is a very good air barrier but does not provide any type of water vapor barrier. It is much more sponge-like in appearance. It is often used for interior walls because it provides sound reduction. Closed cell foam is much denser than open cell. It has a smaller, more compact cell structure. It is a very good air barrier as well as a water vapor barrier. It is often used in roofing projects or other outdoor applications, but can be used anywhere in the home, including Kindles. An example density of foam is 0.2 g/cm$^3$. An example 25% Compression Force Deflection is 0.0231 Mpa.

As mentioned above, the foam 148 may be compressed and exert pressure on the bottom surface of substrate 138. For example, the foam 148 may have an uncompressed thickness of 0.5 mm and a compressed thickness of 0.25 mm. In some examples, the pressure exerted by the foam 148 may reduce the risk of delamination of the layers of the display stack, for example, by reducing the interfacial stresses on the adhesives. For example, it has been found that fewer devices fail when exposed to heat or other contributors to delamination when a foam layer 106 is included. For example, in devices such as that shown in FIG. 1 where OCA 126 is fifty (50) um thick and OCA 128 is 100 um thick, devices without a foam layer 106 suffered seventeen (17) device failures of sixty-five (65) devices tested (i.e. 26% failures) but devices with a foam layer 106 suffered only two device failures of fifty-two (52) devices tested (i.e.

4%). In devices such as that shown in FIG. 1 where OCA 126 and OCA 128 are both 100 um thick, devices without a foam layer 106 suffered eight (8) device failures of fifty-four (54) devices tested (i.e. 15% failures) but devices with a foam layer 106 suffered no device failures of forty-two (42) devices tested (0%). In devices such as that shown in FIG. 1 where OCA 126 and OCA 128 are both 50 um thick, devices without a foam layer 106 suffered nine (9) device failures of eleven (11) devices tested (i.e. 82% failures) but devices with a foam layer 106 suffered only two device failures of ten (10) devices tested.

The frame 146 may attach to various layers of the display stack 102. As discussed above, in some examples, portions of the frame 146 may extend up around the display stack 102 to the bottom of, for example the cover glass 120 and be attached to the bottom of the edge of the cover glass 120 by bonding or mechanical fixation. Illustration of such examples is provided by FIGS. 4 and 5.

In a particular example, the cover component 108 may have a thickness of 0.55 millimeters (mm), the OCA 126 may have a thickness of 0.1 mm, the OCA 128 may have a thickness of 0.1 mm, the front light component 112 may have a thickness of 0.5 mm, the OCA layer 110 may have a thickness of 0.15 mm and the display component may have a thickness of 0.7 mm. However, the above thicknesses are merely examples and many variations are possible.

Figure 2:
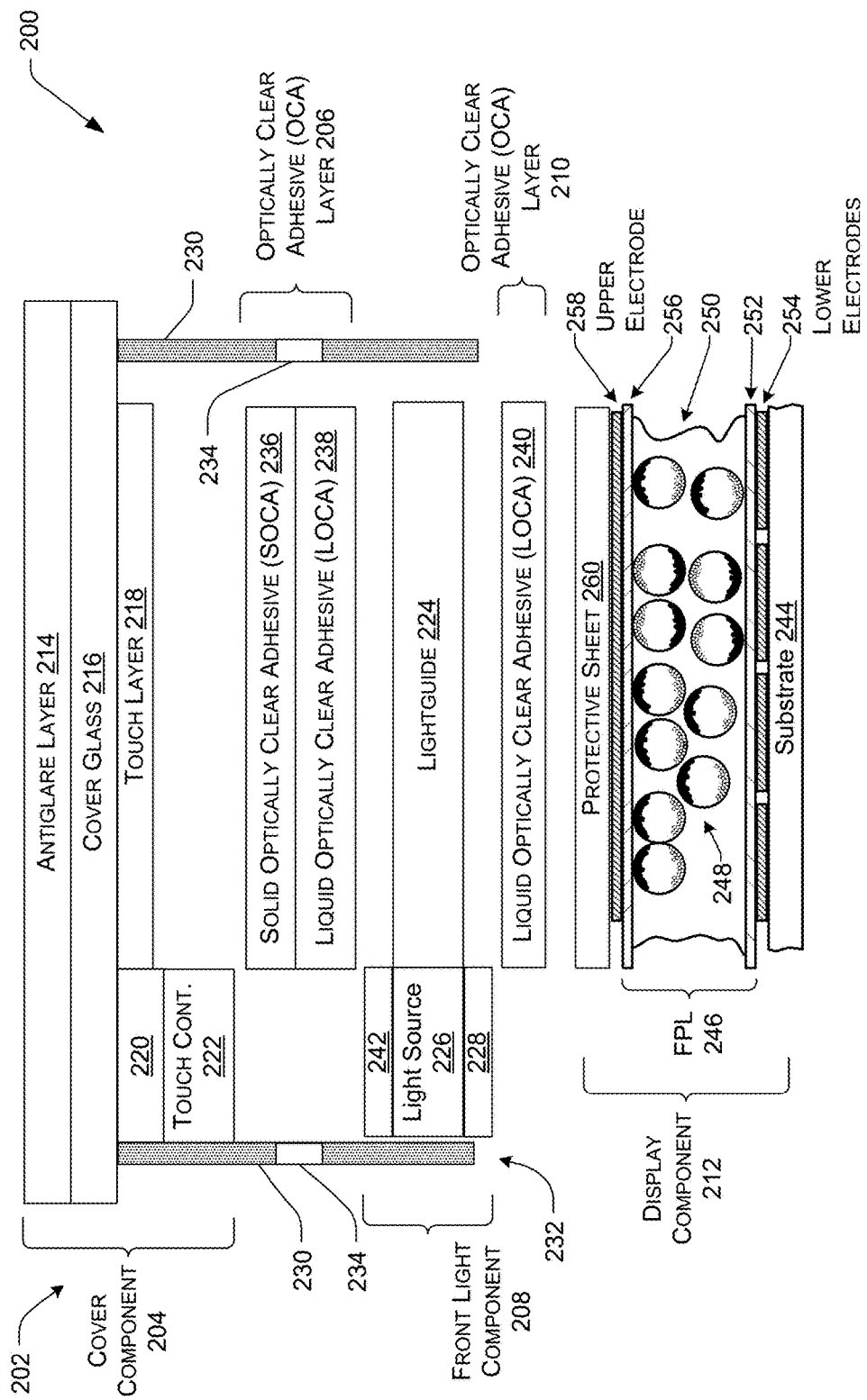
FIG. 2 illustrates an example schematic cross-section of a display stack of an electronic device.

FIG. 2 illustrates a second example schematic cross-section of a display stack of an electronic device 200. The cross-section illustrates the display stack 202 including individual layers of a cover component 204, OCA layer 206, front light component 208, OCA layer 210, and display component 212. In the illustrated example, the cover component 204 includes an antiglare layer 214 applied to a top surface of a coverglass 216 and a touch layer 218 applied to a bottom surface of the coverglass 216. In some cases, the touch layer 218 may also be electronically coupled to touch controller 222, for example, directly or via a flexible circuit (not shown) to from a touch sensor or touch enabled display capable of both presenting content and receiving user inputs related to the presented content.

In general, the coverglass 216 may be configured to protect the display from damage, such as scratching, chipping, peeling, as well as to provide rigidity and stiffness to the overall device 200 (e.g., to prevent the electronic device 100 from bending or deforming when held). Thus, the coverglass 216 may be configured to run the entire width and depth of the electronic device 100. As previously mentioned, in some examples, a frame of the electronic device 200 may attach to portions of the bottom surface of the cover component or subcomponents thereof (e.g. the coverglass, the antiglare layer, the touch layer, etc.). For example, the coverglass 216 may be dimensioned to extend beyond the components of the display stack 202 below to the bottom of the coverglass 216. This "lip" or overhang may be configured to be attached to the frame of the electronic device 200 by bonding or mechanical fixation.

In some cases, the coverglass 216 may have a hardness rating that is resistant to a 9H pencil or greater, while in other cases, the coverglass 216 may have a hardness rating between 3H pencil and 9H pencil. In general, the coverglass 216 may be manufactured to be less than 1 mm thick and, in some implementations, may be in the range of 0.5 mm to 0.7 mm. In some examples, the coverglass 216 may be formed from a substantially optically clear glass. In other examples, the coverglass 216 may be formed from a substantially optically clear plastic.

The antiglare layer 216 may be formed by applying an antiglare coating or film to a top surface of the coverglass 216. For example, the top surface of the coverglass 216 may be coated or dipped in the antiglare coating which may be cooled or UV-cured. In other examples, an antiglare film may be adhered to the top surface of the coverglass 216, for instance, using an OCA, LOCA, or SOCA. In other implementations, the outer antiglare layer 214 may be selectively etched into the top surface of the coverglass 216. In one example, the antiglare etching may be formed by applying a chemical spray or bath to the top surface of the coverglass 216. In some cases, the antiglare layer 216 may be formed to include additional proprieties such as antireflective properties, anti-smudging or anti-fingerprinting properties, and/or anti-cracking properties.

In general, a touch sensor includes a touch pattern (e.g., rows and columns in a grid or diamond shape) and a touch controller 222. In some particular implementations, the touch layer 218 may be a single layer multi-touch pattern that may be traced upon a single side of a substrate, such as the coverglass 216. The touch layer 218 may include traces made from ITO, printed ink, metal mesh technologies, or the like applied to a bottom surface of the coverglass 216. For example, traces of ITO may be deposited or patterned onto the bottom surface of the coverglass 216 using physical vapor deposition, electron beam evaporation, or sputter deposition techniques, among others. In other examples, a conductive ink may be printed on the bottom surface of the coverglass 216 or a pre-formed metal mesh technology or wiring may be adhered or laminated to the bottom surface of the coverglass 216 to form the touch layer 218. Furthermore, in some instances, the touch layer 218 may include a transparent conductor other than, or in addition to those described above.

In some implementations, the cover component 204 includes at least one black mask 220 arranged beneath at least a portion of the coverglass 216. For example, black ink, paint, or a black tape may be applied to selected portions or locations of the underside of the coverglass 216 and arranged to prevent errant light from reflecting or shining off of components located along the side of the display stack 202 (e.g., the touch controller 222). In some particular examples, a pattern or image may be cut from the black mask 220 such that light may escape to the surface of the display, for example, to illuminate one or more control images or areas located in the boarder of the display to a user.

The front light component 208 generally includes a lightguide 224 connected to a light source 226. The lightguide 224 may include a substrate (not shown) formed from a transparent thermoplastic (such as PMMA), a layer of lacquer and multiple grating elements that function to propagate light from the light source 226 towards the top surface of the display stack 202, thus illuminating the content presented on the display. For example, the lightguide 224 may be formed by applying a layer of lacquer to the substrate to create the grating elements of the lightguide 224, the grating elements may be embossed to the layer of lacquer to from a positive or negative relief and the lightguide 224 may be UV-cured. Alternatively, the substrate of the lightguide 224 and the grating elements may be manufactured as a single element, such as via an injection molding process. In some instances, the UV lacquer is made of a cross-linked, tri-functional polymer material that co-polymerizes to a plastic solid when exposed to a high-intensity UV light source.

In some implementations, the light source 226 may be connected to a FPC 228 to control the amount and volume of light generated. In some instances, the light source 226 (e.g., one or more LEDs) may be connected to the FPC 228 via one of the OCA layers 206 or 210. For example, the FPC 228 may be connected to the light source 226 via a solid strip of SOCA or the like. The FPC 228 may also be connected to the lightguide 224 via the OCA layers 206 and 210. In some instances, the FPC 228 may include a light-diffusing reflective coating (e.g., in the form of a white matte finish), which may help to diffuse and reflect light from the light source 226 and, hence, increase the uniformity of the light across the front of the display screen.

In some implementations, a ring adhesive 230 may be applied around the outer edge of the display stack 202. The ring adhesive 230 may be utilized to bond and hold the various components of the display stack 202 together in a coherent manner. In some cases, such as the illustrated example, the ring adhesive 230 may extend partially down in the z direction, for instance, to substantially encase or encompass the cover component 204 and the front light component 208 or portion(s) thereof. For example, the ring adhesive may adhere to the bottom of the cover glass 216 and substantially encase or encompass the lower components of the cover component 204 (e.g. the touch layer 218, the black mask 220, the touch controller 222) and/or a portion of the front light component 208. In some implementations, the ring adhesive 230 is configured to prevent light from escaping or leaking out of the display stack 202. In some specific examples, the display may be configured to be flexible such that a user may deform or deflect the entire electronic device 100 to some degree, for instance, to receive a user input. To do so the ring adhesive 230 may be bonded on the perimeter of the display stack 202 and an air gap, generally indicated by 232, may be located underneath the main portion of the display stack 202.

In some specific examples, the ring adhesive 230 may have one or more compliant or flexible areas, such as areas 234. For example, the ring adhesive 230 may be formed from very high bond (VHB) material (one example of which is available from 3M®), while the areas 234 may be formed from a soft or flexible material, such as various foams, foam tapes, liquids, and/or an air gap. By providing the flexible areas 234, a display stack 202 may be generated that allows various portions of the electronic device 200 to flex at desired locations, for example, to receive user inputs.

In the illustrated example, the two layers of OCA 206 and 210 are arranged above and below the lightguide 224 help maintain the light generated by the light source 226 within the lightguide 224, as well as to join the cover component 204 and the display component 212 with the front light component 208. In general, the OCA layer 206 is arranged atop the front light component 208 and the OCA layer 210 is arranged beneath the front light component 208.

As illustrated, the OCA layer 206 may be formed from two types or layers of OCA, OCA 236 and OCA 238. The OCA 236 may have predetermined UV properties and the OCA 238 may have predetermined refractive index. In various implementations, the particular UV properties may be tailored or selected based on the type and characteristics of the component of the display stack and the refractive properties may be tailored or selected based on the type and characteristics of the front light component 208 (e.g., the light source 226 and/or the lightguide 224). For example, the OCA 236 may have a luminous transmittance of 90% or greater above 400 nanometer (nm) wavelengths, 5% or less below 300 nm wavelength, and between 5% and 90% between 300 and 400 nm wavelength. In one particular example, the luminous transmittance of the OCA 236 may be zero below 380 nm wavelength and greater than 90% above 400 nm wavelength. In another example, the refractive index for the OCA 238 may be in a range from about 1.3 about 1.51. In another example, the refractive index of the OCA 238 may be in the range of about 1.39 to 1.45. In one particular example, the refractive index of the OCA 238 may be about 1.41. In illustrated example, the OCA layer 206 may be formed by applying a LOCA 238 to the underside of an OCA film 236. For example, a silicone LOCA may be applied to an acrylic OCA film under a pressure of 50 Pascal (Pa) or less for 20 to 30 seconds using a vacuum lamination process. By substituting a LOCA for one of the OCA films in this manner, the number of bubbles (e.g., practical bubbles) that typically form when OCA films are bonded to each other may be reduced and/or eliminated, in some cases, improving overall optical quality of the display. By reducing the number of bubbles that form between the OCA films, the number of mechanical failures that may occur during stress testing when the bubbles in the display stack 202 are exposed to heat, pressure, or a combination thereof may be reduced improving overall manufacturing yields, thus reducing overall costs.

The OCA layer 210 may be formed from a single layer of silicone LOCA 240 having the predetermined refractive index. As one example, the LOCA 240 may comprise Loctite® 5192™, an optically transparent UV-curable silicone-based adhesive available from Henkel AG & Co. KGaA of Düsseldorf, Germany. In some instances, the LOCA 240 may include a photoinitiator to facilitate UV curing. Examples of photoinitiators include cationic photoinitiators such as organic iodonium or sulfonium salts. The LOCA 240 may be applied to a surface, such as by rolling using a wet coating method or other suitable technique, followed by UV curing (e.g., using a fusion lamp).

In addition to the OCA layers 206 and 210, a white tape 242 or other type of light-diffusing reflective coating may be laid along a perimeter of the lightguide 224, which again may help to diffuse light from the light source 226 and increase the uniformity of the light from the light source 226. Although shown as being attached to the perimeter of the OCA layer 206, the white tape 242 or other type of light-diffusing reflective coating may be further laid along other elements of the display stack 202, such as the lightguide 224.

In the illustrated example, the front light component 208 resides atop the display component 212. As illustrated, the component 212 is a reflective display that includes the substrate 244, such as of glass or other suitable material, and a front plane laminate (FPL) 246, which serves as the image-displaying component. In this example, the FPL 246 includes capsules, generally indicated by 248, as well as a fluid, generally indicated by 250, in which the capsules 248 are suspended. In addition, the FPL 246 includes a lower plastic film 252 onto which the fluid 250 and capsules 248 are deposited, such as using a roll-to-roll process. A grid or pattern of lower electrodes 254 is associated with the lower plastic film 252. Similarly, an upper transparent plastic film 256 may be located on the upper side of the fluid 250 for containing the fluid 250 and the capsules 248.

The display component 212 also includes at least one upper electrode 258 associated with the upper film 256. In some examples, the upper electrode 258 may include a grid or pattern of transparent electrodes formed from ITO or other suitable transparent conductive material. As one particular example, aligned pairs of the upper electrodes 258 and lower electrodes 254 may each form a single pixel of the display stack 202. For instance, each capsule 248 may include dark and light particles inside the capsule 248. A positive charge on an electrode pair may cause a first color of particle to rise toward the upper plastic film 256 while a negative charge on an electrode pair may cause a second color of particle to rise toward the plastic film 256. A display controller (not shown) may control the charge applied to each electrode pair. Furthermore, in some examples, the pixels (i.e., electrode pairs) may be controlled by applying a sequence of voltages to each pixel, instead of just a single value as in a typical LCD. These sequences of voltages may be referred to as "waveforms," and may be employed to prevent over-charging of the capsules 248, prevent damage to the capsules 248, and so forth.

A protective sheet 260 may be assembled atop the FPL 246, so that the FPL 246 is sandwiched between the protective sheet 260 and the substrate 244. Thus, the protective sheet 260, the FPL 246, and the substrate 244 may be assembled or laminated together to form the display component 212. In some implementations of, described herein, the protective sheet 260 may be manufactured at a reduced thickness by removing various treatments, such as the UV treatments, typically associated therewith (e.g. the UV etching described above with respect to the coverglass 216 of the display stack 202).

Figure 3:
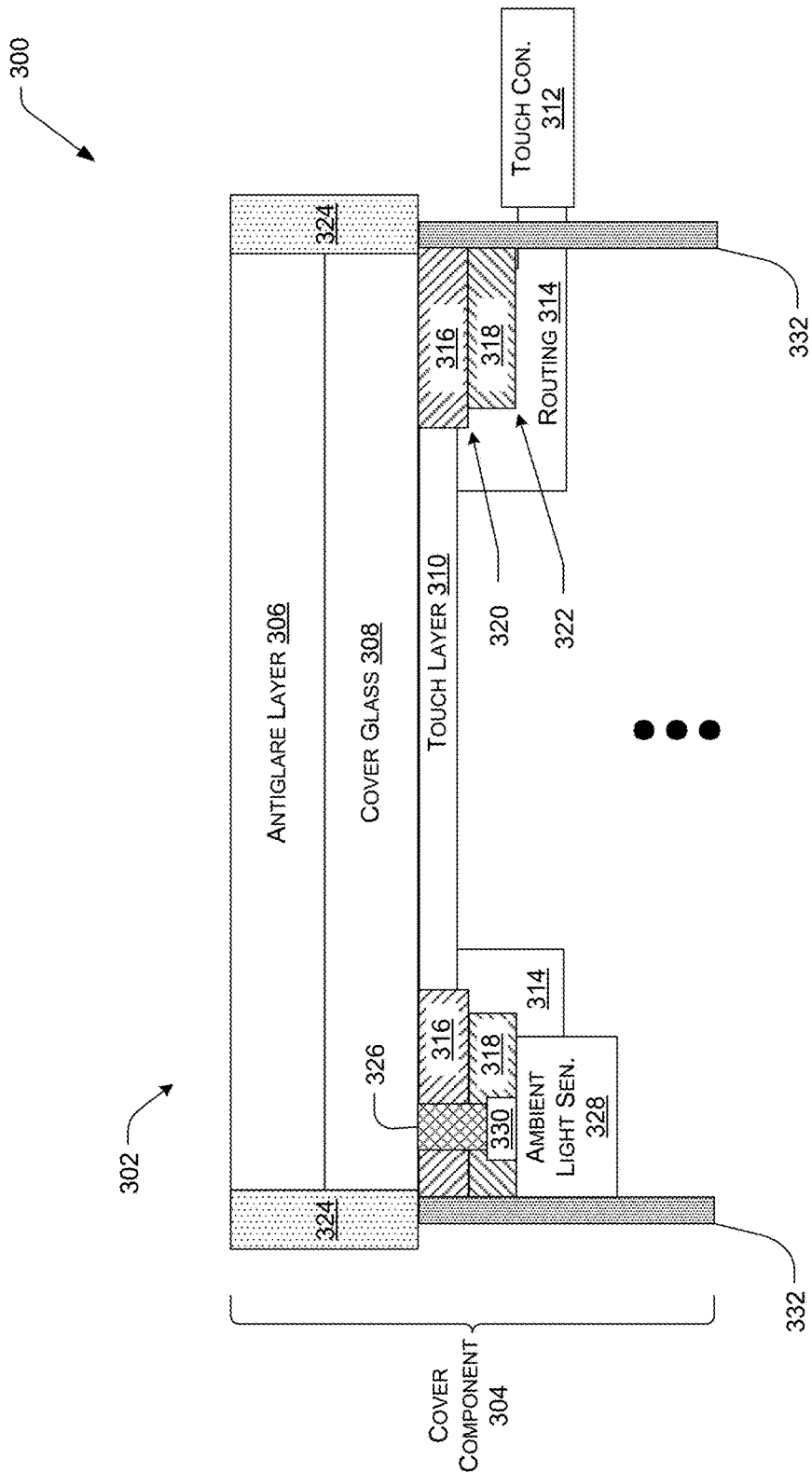
FIG. 3 illustrates example partial schematic cross-section of a display stack of an electronic device.

FIG. 3 illustrates an example partial schematic cross-section 300 of the electronic device 302. The cross-section 300 illustrates select elements of the cover component 304 of the display stack 302. In the illustrated example, the cover component 304 includes an antiglare layer 306 applied to a top surface of a coverglass 308 and a touch layer 310 applied to a bottom surface of the coverglass 308. In some cases, the touch layer 310 may also be electronically connected to touch controller 312, for example, directly or via a routing 314 (e.g., an ITO routing or flexible circuit) to form a touch sensor or touch enabled display capable of both presenting content and receiving user inputs related to the presented content.

In general, a touch sensor includes a touch pattern (e.g., rows and columns in a grid or diamond shape) and a touch controller 312. In some particular implementations, the touch layer 310 may be a single layer multi-touch pattern that may be traced upon a single side of a substrate, such as the coverglass 308. The touch layer 310 may include traces made from ITO, printed ink, metal mesh technologies, or the like applied to a bottom surface of the coverglass 308. For example, traces of ITO may be deposited or patterned (e.g., to form a diamond or grid) onto the bottom surface of the coverglass 308 using physical vapor deposition, electron beam evaporation, or sputter deposition techniques among others. In other examples, a conductive ink may be printed on the bottom surface of the coverglass 308 or a pre-formed metal mesh technology or wiring (e.g., silver nanowires or carbon nanotubes) may be adhered or laminated to the bottom surface of the coverglass 308 to form the touch layer 310. Furthermore, in some instances, the touch layer 310 may include a transparent conductor other than, or in addition to, those described above.

In the illustrated example, the cover component 304 includes two black masks 316 and 318 arranged beneath at least a portion of the coverglass 308. The black masks 316 and 318 may be a tape, paint, ink or the like applied to the bottom surface of the coverglass 308 to capture, or block light from, leaking out of the display stack 302. As illustrated, each black mask 316 and 318 has a thickness greater than that of the touch layer 310 resulting in the steps 320 and 322 forming between the touch layer 310 and the touch controller 312. Thus, the routing 314 may be utilized to connect the touch layer 310 to the touch controller 312, as the touch layer 310 may not be flexible enough to travel over the step 320 and/or 322 without cracking.

In the illustrated example, the black mask includes a two layer mask formed from the black mask 316 being arranged atop the black mask 318. In the illustrated example, the black mask 316 is shown as extending past the edge of the black mask 318 to create a two step or tiered black mask. By utilizing two black masks 316 and 318 with two steps 320 and 322, the routing 314 (e.g. a flexible circuit) that couples the touch controller 312 to the touch layer 310 is able to traverse two smaller steps 320 and 322 in lieu of one larger step reducing the risk that the routing 314 will break or crack under stress.

The coverglass 308 may be configured to protect the display from damage, such as scratching, chipping, peeling, as well as to provide rigidity and stiffness to the overall device 300 (e.g., to prevent the electronic device 100 from bending or deforming when held). Thus, the coverglass 308 may be configured to run the entire width and depth of the electronic device 300. In some cases, the coverglass 308 may have a hardness rating that is resistant to a 9H pencil or greater, while in other cases, the coverglass 308 may have a hardness rating between 3H pencil and 9H pencil. In general, the coverglass 308 may be manufactured to be less than 1 millimeter (mm) tall and, in some implementations, may be in the range of 0.5 mm to 0.7 mm. In some examples, the coverglass 308 may be formed from a substantially optically clear glass. In other examples, the coverglass 308 may be formed from a substantially optically clear plastic.

The antiglare layer 308 may be formed by applying an antiglare coating or film to a top surface of the coverglass 308. For example, the top surface of the coverglass 308 may be coated or dipped in the antiglare coating which may be cooled or UV-cured. In other examples, an antiglare film may be adhered to the top surface of the coverglass 308, for instance, using an OCA, LOCA, or SOCA. In other implementations, the outer antiglare layer 306 may be selectively etched into the top surface of the coverglass 308. In one example, the antiglare etching may be formed by applying a chemical spray or bath to the top surface of the coverglass 216. In some cases, the antiglare layer 308 may be formed to include additional proprieties such as antireflective properties, anti-smudging or anti-fingerprinting properties, and/or anti-cracking properties.

In the illustrated example, the antiglare layer 306 and the coverglass 308 have an edge ink 324 applied to sustainably around the entire edge of the cover component 304 (e.g., the side walls and bottom chamfer of the coverglass 308). The edge inking 324 may be an oil based marker or ink that is applied to the edge of the coverglass 308 and cured at a temperature of 50° C. to prevent light from traveling through the coverglass 308, as if the coverglass 308 were a lightguide, and shining off various components (e.g., the touch controller 312) of the display stack 302 arranged along the edge of the coverglass 308. In some cases, the oil based maker may be applied by a robot programmed to walk the perimeter of the coverglass 308. In other cases, the oil based marker or ink maybe applied by using a dispensing pen. In some specific examples, the edge ink 324 may be applied using techniques such as Pad Printing, ink-jet, spray, and so on.

In some implementations, the amount of light emitted by the front light component may be variable. For instance, upon opening a cover (not shown) of the electronic device 300, the light from the front light may gradually increase to its full illumination over a period of time. In other instances, the amount of light emitted by the front light component may depend on the amount of light present in the environment surrounding the electronic device 300. Thus, in the illustrated example, the cover component 304 includes a window 326 to allow light to travel through the antiglare layer 306, the coverglass 308, and the black masks 316 and 318 to access an ambient light sensor 328. In this example, the illumination of the front light component may be based at least in part on the amount of ambient light detected by the ambient light sensor 328. For instance, the front light may emit a greater concentration of light if the ambient light sensor 328 detects relatively little ambient light in the environment, and may emit a lesser concentration of light if the ambient light sensor 328 detects a relatively large amount of ambient light in the environment. In some implementations, the ambient light sensor 328 may be configured to maintain a contrast ratio for the display stack 302 that is within a predetermined range. In some specific implementations, an ink layer 330 may be located over the ambient light sensor 328 to color match the ambient light sensor 328 with the coverglass 308, for instance, to prevent the user from visually perceiving the ambient light sensor 328 when viewing the display stack 302.

In the illustrated example, a ring adhesive 332 may be applied around the outer edge of at least part of the cover component 304. The ring adhesive 332 may be utilized to bond and hold the various components of the display stack 302 together. In some cases, such as the illustrated example, the ring adhesive 332 may extend partially down in the z direction, for instance, to substantially encase or encompass the cover component 304 or portion(s) thereof. For example, the ring adhesive 332 may adhere to the bottom of the cover glass 308 and substantially encase or encompass the lower components of the cover component 304 (e.g. the touch layer 310, the black masks 316 and 318 and the ambient light sensor 328) and/or a portion of the front light. In some implementations, similar to the edge ink 324, the ring adhesive 332 may be configured to prevent light from escaping or leaking out of the display stack 302. In some specific examples, the display may be configured to be flexible such that a user may deform or deflect the entire electronic device 100 to some degree, for instance, to receive a user input. To do so the ring adhesive 332 may be bonded on the perimeter of the cover component 304 and an air gap may be located underneath the main portion of the cover component 304 to allow for flexing of the display stack 302.

Figure 4:
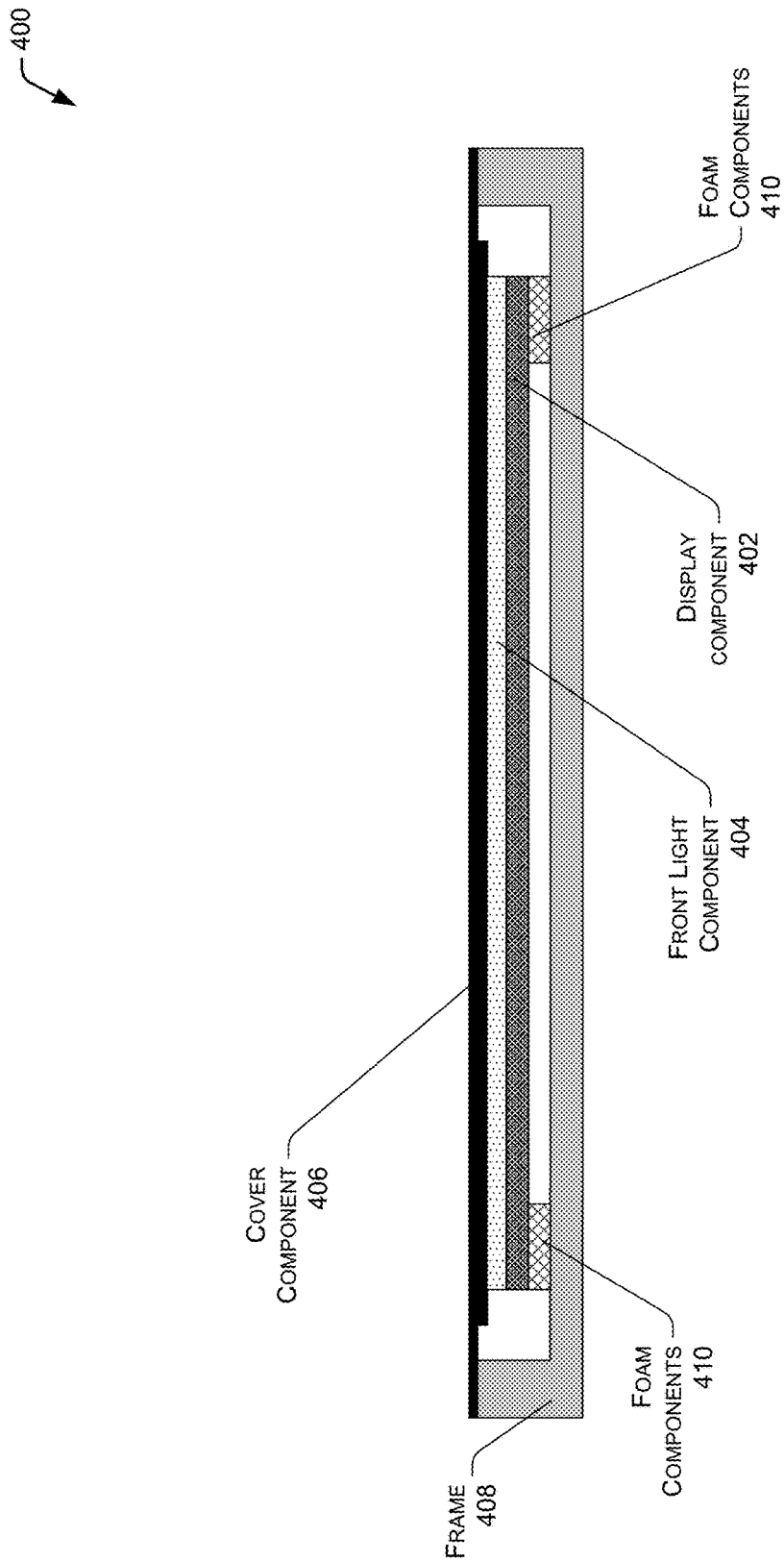
FIG. 4 illustrates an example schematic cross-section of an electronic device.

FIG. 4 illustrates a cross section 400 of an electronic device, such as electronic device 100. More particularly, FIG. 4 illustrates a simplified view of an example of an electronic device, such as electronic device 100, as assembled. Components of such an electronic device may include a display component 402 on top of which a front light component 404 is affixed. A cover component 406 may be affixed atop the front light component 404. Thereby, a display stack similar to those illustrated in FIGS. 1 and 2 may be formed.

A frame 408 of the electronic device may be disposed around at least a portion of the display stack. In some implementations, the frame 408 may comprise a plurality of pieces. For convenience, and not by way of limitation, the frame may be described as having a front side and a back side. The front side of the frame is the portion of the frame 408 which is proximate to the user during use. Conversely, the back side of the frame is that which is distal to the user during use. For example, the front side of the frame is the side from which the user is intended to view images presented on the display.

As illustrated, the cover component 406 is disposed such that a portion of the back side of the cover component 406 is proximate to the front side of the frame 408. In some implementations, a mechanical joint or adhesive or both may join the frame 408 with the cover component 406.

As illustrated, the frame 408 is configured such that a gap is formed between portions of the bottom surface of the display stack (e.g. the bottom of the display component 402) and the corresponding portions of the top surface of the frame 408. In the example shown in FIG. 4, a plurality of foam components 410 are disposed in the gap. Depending on the details of the implementation, the foam components 410 may be disposed proximate various portions of the display stack. For example, in some implementations, foam components 410 may be disposed below each corner of the display stack. In addition or alternatively, foam components 410 may be disposed below the midpoint of the outer edges of the display stack or below the center of the display stack. In some examples, selection of the portions of the display stack below which foam components may be disposed may be based on analysis of delamination risks of the display stack (e.g. due to interfacial stresses on the adhesives). Other factors may also be considered when placing foam components in the gap, such as any impact on the operation of the components of the electronic device (e.g. a need for an empty space beneath the display stack for operation of the touch sensor).

As discussed above, in some examples, the foam components 410 may be compressed between the frame 408 and the display component 402. For example, the foam components 410 may be placed on one of the bottom surface of the display component 402 or top surface of the frame 408 prior to affixing the display stack to the frame 408. Then, during the joining of, for example, the cover component 406 to the frame 408, the foam components 410 are compressed between the display component 402 and the frame 408. In this way, once the cover component 406 to the frame joined, the compressed foam components 410 provide a constant pressure on the display stack. In this way, the risk of delamination of the display stack may be reduced (e.g. by reducing the interfacial stresses on adhesives binding the layers together).

Figure 5:
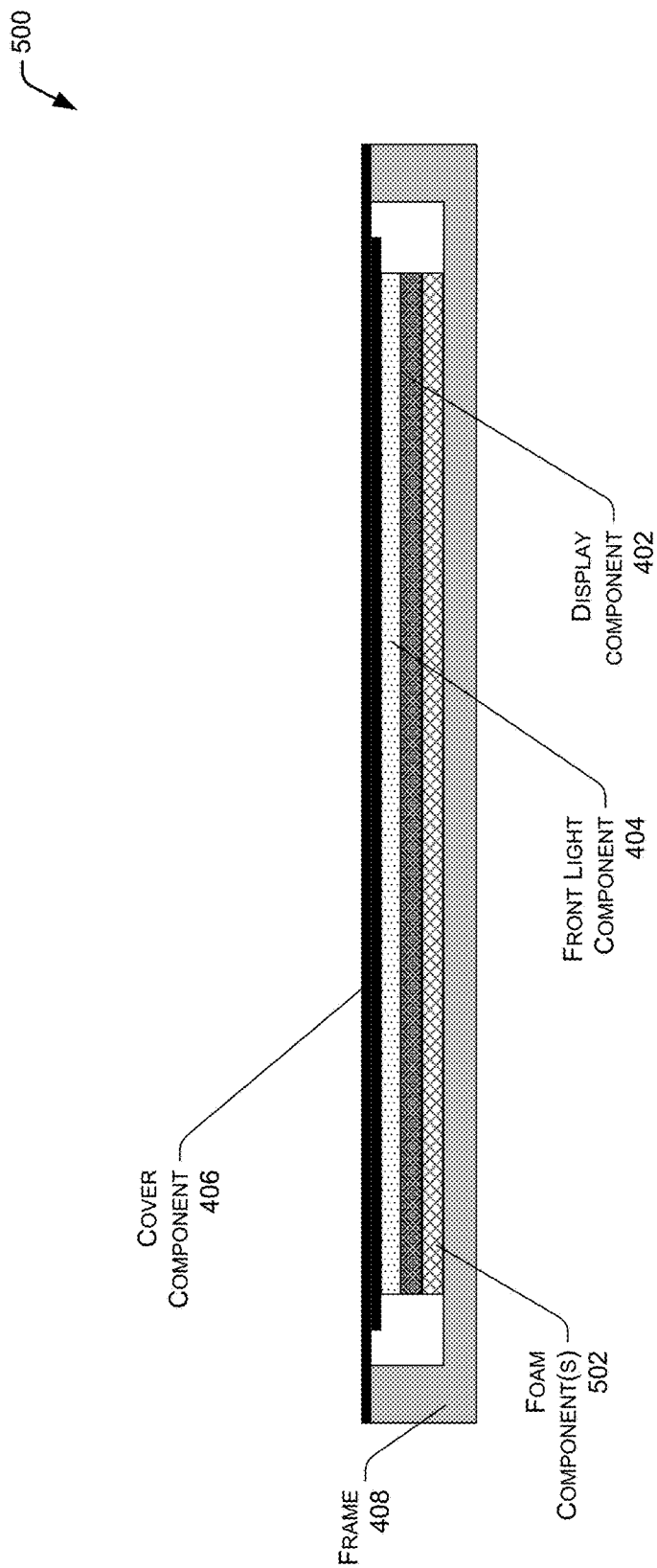
FIG. 5 illustrates an example schematic cross-section of an electronic device.

FIG. 5 illustrates a cross section 500 of an electronic device, such as electronic device 100. More particularly, FIG. 5 illustrates a variation of the electronic device shown in FIG. 4 and figure numbers are reused for the same or similar components. More particularly, FIG. 5 includes an example of an electronic device in which the foam components 410 are replaced with a foam component 502 that fills the gap between the bottom surface of the display stack (e.g. the bottom of the display component 402) and the corresponding portions of the top surface of the frame 408.

Several configurations of foam components disposed in the gap between the display stack and the frame have been described above. However, implementations are not limited to these configurations and may others may be envisioned in view of this specification. For example, a plurality of strips of foam may be used and disposed in any number of ways based on the details of the implementation. Moreover, the components disposed in the gap between the display stack and the frame are referred to as foam herein. However, materials other than foam may be used in some implementations without deviating from the scope of this disclosure.

Any number of materials may be used which, when compressed, exert a reaction force.

Figure 6:
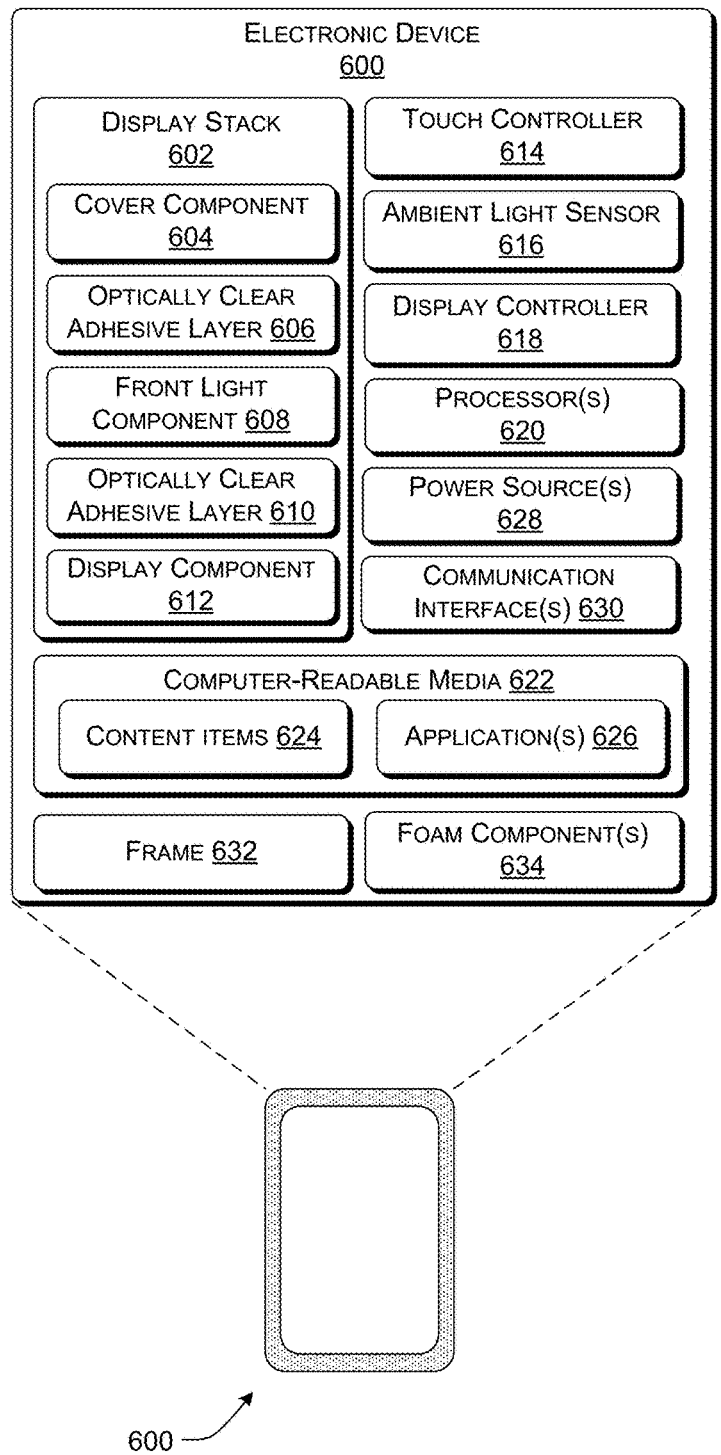
FIG. 6 illustrates a functional block diagram of an electronic device that includes the display stack of FIGS. 1-3.

FIG. 6 illustrates an example electronic device 600 that includes a display stack 602. In general, the device 600 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 4 illustrates several example components of the electronic device 600, it should be appreciated that the device 600 may also include other conventional components, such as an operating system, system busses, input/output components, and the like.

In general, the display stack includes a cover component 604, a first OCA layer 606, a front light component 608, a second OCA layer 610, and a display component 612. In one implementation, the cover component 604 includes a coverglass having an outer antiglare layer exposed to a user of the electronic device. In one implementation, the outer antiglare layer is formed by applying an antiglare coating or film to the top surface of the coverglass. In other implementations, the outer antiglare layer may be selectively etched onto the top surface of the coverglass. In one example, the antiglare etching may be formed by applying a chemical spray or bath to the top surface of the coverglass. In some cases, the antiglare etching may be formed to include additional proprieties such as antireflective properties, anti-smudging or anti-fingerprinting properties, and/or anti-cracking properties. In some instances, the outer antiglare layer may be manufactured such that the resulting surface includes a hardness rating that is greater than a predefined threshold. In this way, the cover component 604 may have an outer surface that is resistant to scratches caused by objects having a hardness rating less than the predefined threshold (e.g., at least a hardness rating that is resistant to a 3H pencil).

In some implementations, the coverglass may have a touch layer or touch pattern applied to the bottom surface to form a display capable of receiving inputs, as well as displaying content. In some cases, the touch layer or touch pattern may be formed from traces of indium tin oxide (ITO). For example, traces of ITO may be deposited or patterned onto the bottom surface of the coverglass, for example, using physical vapor deposition, electron beam evaporation, or sputter deposition techniques, among others. In other cases, a conductive ink may be printed on the bottom surface of the coverglass or a pre-formed metal mesh technology or wiring (e.g., silver nanowires or carbon nanotubes) may be adhered or laminated to the bottom surface of the coverglass to form the touch layer.

In general, a touch controller 614 may be utilized in combination with the touch layer to form a touch-sensitive display stack 602. Thus, the display stack 602 may be capable of both accepting user touch input and rendering content in response to or corresponding to the touch input. As several examples, the touch layer and the touch controller 614 may together form a capacitive touch sensor incorporated into the display stack 602, a force sensitive resistance (FSR) sensor, an interpolating force sensitive resistance (IFSR) sensor, or any other type of touch sensor. In this manner, the display stack 602 may provide a touch-sensitive display capable of detecting user inputs, as well as displaying content. In some instances, the touch sensor may be capable of determining an amount of pressure or force associated with a touch input. In some specific examples, the touch layer may be electronically coupled with the touch controller 614 via a flexible circuit (not shown).

In some implementations, the cover component also includes a black mask arranged beneath at least a portion of the coverglass. For example, black ink or a black tape may be applied to selected portions or locations of the underside of the coverglass and arranged to prevent errant from reflecting or shinning off various component of the display stack 602. In some instances, the black mask may also be utilized to hide various components of the display stack, such as the touch controller 614 and the flexible circuit. In some implementations, the black mask may be a two layer black mask. For example, the two layer black mask may be formed by applying two layers of black ink, two layers of black tape, or one layer of black ink and one layer of black tape to the bottom surface of the coverglass. In the two layer design, the black mask may be arranged to provide a stepped or tiered effect, such that the flexible circuit climbs or traverses two smaller steps in lieu of one larger step when coupling the touch controller 614 to the touch layer. By utilizing the two step design, display stack 602 becomes more resilient, as the likelihood of damage to the flexible circuit is reduced.

In some specific implementations, in addition to the black mask, the outer edges of the coverglass may be inked with an oil based marker or ink to prevent light from traveling through the coverglass, as if the coverglass was a lightguide and, thus, to prevent the light from leaking through the coverglass at undesirable locations and/or shining off various components of the display stack 602 arranged along the edge of the coverglass. In general, the edge inking improves the overall quality of the display, particularly in dark environments.

The electronic device 600 may also include a front light component 608 (which may alternatively be a backlight component in the case of a backlit display) for lighting the display stack 602. The front light component 608 may include a lightguide portion and a light source. The lightguide portion may include a substrate including a transparent thermoplastic polymer. For example, the lightguide portion can include an acrylic polymer. In one implementation, the lightguide portion can include polymethylmethacrylate (PMMA). In a particular implementation, the lightguide portion can include a substrate, a layer of lacquer and multiple grating elements formed in the layer of lacquer. The multiple grating elements may be configured to propagate light to illuminate the display component 612. In some specific examples, the multiple grating elements may be formed using a positive relief technique when applying the layer of lacquer to the substrate.

In some implementations, the light source may be connected to a flexible printed circuit (FPC) to control the amount and volume of light generated. The LEDs selected for inclusion in the light source may have a color that is optimized for the type of display being used. For instance, multiple different color temperature LEDs having particular color ratios there between may be selected to ensure a proper color from the collection of LEDs when lighting the display. Furthermore, the color of the LEDs may be tuned over time to compensate for changes in the lightguide, as well based on other factors, such as the aging of the LEDs, the intended environment. In one particular implementation, the light source may include six LEDs utilized in combination.

Furthermore, the amount of light emitted by the front light component 608 may vary. For instance, upon a user opening a cover of the electronic device 600, the light from the front light component 608 may gradually increase to its full illumination. In some instances, the electronic device 600 includes an ambient light sensor 616 and the amount of illumination of the front light component 608 may be based at least in part on the amount of ambient light detected by the ambient light sensor 616. For example, the front light component 608 may be dimmer if the ambient light sensor 616 detects relatively little ambient light, such as in a dark room; may be brighter if the ambient light sensor 616 detects ambient light within a particular range; and may be dimmer or turned off if the ambient light sensor 616 detects a relatively large amount of ambient light, such as direct sunlight.

In addition, the settings of the display component 612 may vary depending on whether the front light component 608 is on or off or based on the amount of light provided by the front light component 608. For instance, the electronic device 600 may implement a larger default font or a greater contrast when the front light component 608 is off compared to when the front light component 608 is on. In some instances, the electronic device 600 maintains, when the front light component 608 is on, a contrast ratio for the display component 612 that is within a certain defined percentage of the contrast ratio when the front light component 608 is off.

In general, the OCA layer 606 is arranged atop the front light component 608 and the OCA layer 610 is arranged beneath the front light component 608. The OCA layers 606 and 610 may be arranged around the lightguide to prevent errant light from escaping the lightguide in an undesirable manner. The OCA layer 606 may be formed from two types or layers of OCA: the first type having predetermined UV or luminous transmittance rating and the second type having a predetermined refractive index. In various implementations, the particular UV properties may be tailored or selected based on the type and characteristics of the component of the display stack and the refractive properties may be tailored or selected based on the type and characteristics of the front light component (e.g., the light source and/or the lightguide).

In some implementations, the first type of the OCA may be an acrylic OCA having a UV cut and the second type of OCA may be a silicone OCA having specific refractive indexes. In one particular example, the OCA layer 110 is formed by contacting an acrylic OCA film to a silicone OCA film and UV-curing or hardening. In another example, the OCA layer 606 may be formed by applying a liquid OCA (LOCA) to the underside of an OCA film or a SOCA. For example, a silicone LOCA is applied to an acrylic OCA film under a pressure of 50 Pascal (Pa) or less for 20 to 30 seconds using a vacuum lamination process. By substituting a LOCA for one of the OCA films in this manner, the number of bubbles or particle bubbles that typically form between the OCA films may be reduced and/or eliminated, in some cases, improving overall optical quality of the display and reducing mechanical failures that may occur when the bubbles in the display stack 602 are exposed to heat, pressure, or a combination thereof.

The OCA layer 606 may be formed from a single layer of silicone OCA having the predetermined refractive index. In some examples, the OCA layer 606 may be a formed by die-cutting a SOCA film to match the length and width of the lightguide and UV-curing or hardening around the corners and/or the portion of the perimeter. Thereafter, the remaining OCA may be UV-cured. In other examples, a liquid silicone OCA may be placed near a center of the display stack and pressed outwards towards a perimeter of the display stack while UV curing.

The display stack 602 also includes a display component 612 and a corresponding display controller 618. For instance, the display stack 602 may include a display component 612 that may present content via one or more image producing technologies. In various examples, the display component 612 may include a reflective display, such as an electronic paper display, a reflective LCD, or the like. Electronic paper displays represent an array of display technologies that can mimic the look of ordinary ink on paper. In addition, electronic paper displays can be bi-stable, meaning that these displays are capable of holding text or other rendered images even when very little or no power is supplied to the display. Some examples of the display component 612 that may be used with the implementations described herein include bi-stable LCDs, MEMS displays, such as interferometric modulator displays, cholesteric displays, electrophoretic displays, electrofluidic pixel displays, electrowetting displays, photonic ink displays, gyricon displays, and the like. In other implementations, or for other types of electronic devices 600, the display component 612 may include an active display such as a LCD, a plasma display, a LED display, an organic light emitting diode (OLED) display, and so forth. Accordingly, implementations herein are not limited to any particular display technology.

In one implementation, the display component 612 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display component 612 comprises an electrophoretic display that includes oppositely charged light and dark particles. In order to create white, the display controller 618 may move light particles to the front side of the display component 612 by creating a corresponding charge at an electrode near the front of the display component 612 and moves the dark particles to the back of the display component 612 by creating a corresponding charge at an electrode near the back. In order to create black, meanwhile, the display controller 618 changes the polarities and moves the dark particles to the front of the display component 612 and the light particles to the back of the display component 612. Furthermore, to create varying shades of gray, the display controller 618 may utilize different arrays of both light and dark particles. In some cases, the particles may be contained in individual transparent capsules. In a particular example, the capsules can have a diameter included in a range of 35 micrometers to 45 micrometers. The capsules can be suspended in a fluid, such as a liquid polymer, between a transparent upper electrode grid layer and a lower electrode grid layer separated by a gap of approximately 50 micrometers to 200 micrometers.

In still another implementation, the display component 612 may include an electrowetting display that employs an applied voltage to change the surface tension of a liquid in relation to a surface. For instance, by applying a voltage to a hydrophobic surface, the wetting properties of the surface may be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCDs makes the technology suitable for displaying content on portable devices that rely on battery power.

The electronic device 600 also includes one or more processors 620 and computer-readable media 622. Depending on the configuration of the electronic device 600, the computer-readable media 622 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 620.

The computer-readable media 622 may be used to store any number of functional components that are executable on the processors 620, as well content items 624 and applications 626. Thus, the computer-readable media 622 may include an operating system and a storage database to store one or more content items, such as eBooks, audio books, songs, videos, still images, and the like. The computer-readable media 622 of the electronic device 600 may also store one or more content presentation applications to render content on the device 600. The content presentation applications may be implemented as various applications 626 depending upon the content items 624. For instance, one of the applications 626 may be an electronic book reader application for rending textual electronic books, an audio player for playing audio books or songs, a video player for playing video, and so forth.

The electronic device 600 may also includes one or more power sources 628 for providing power to the display stack 602 and one or more communication interfaces 630 to facilitate communication between one or more networks (such as the Internet® or one or more local area networks) and/or directly with one or more devices. The communication interfaces 630 may also facilitate communication between one or more wireless access points, a master device, and/or one or more other computing devices as part of an ad-hoc or home network system. The communication interfaces 630 may support both wired and wireless connection to various networks, such as cellular networks, radio, WiFi networks, short-range or near-field networks (e.g., Bluetooth®), infrared signals, local area networks, wide area networks, the Internet, and so forth.

The electronic device 600 may also include a frame 632 to which the display stack 602 is affixed and foam components 634 is disposed in an air gap between the bottom of the display stack and a top surface of the frame 632. As used herein, the frame may include one or a plurality of subcomponents. Moreover, in some examples, the frame may be a midframe of the electronic device.

Figure 7:
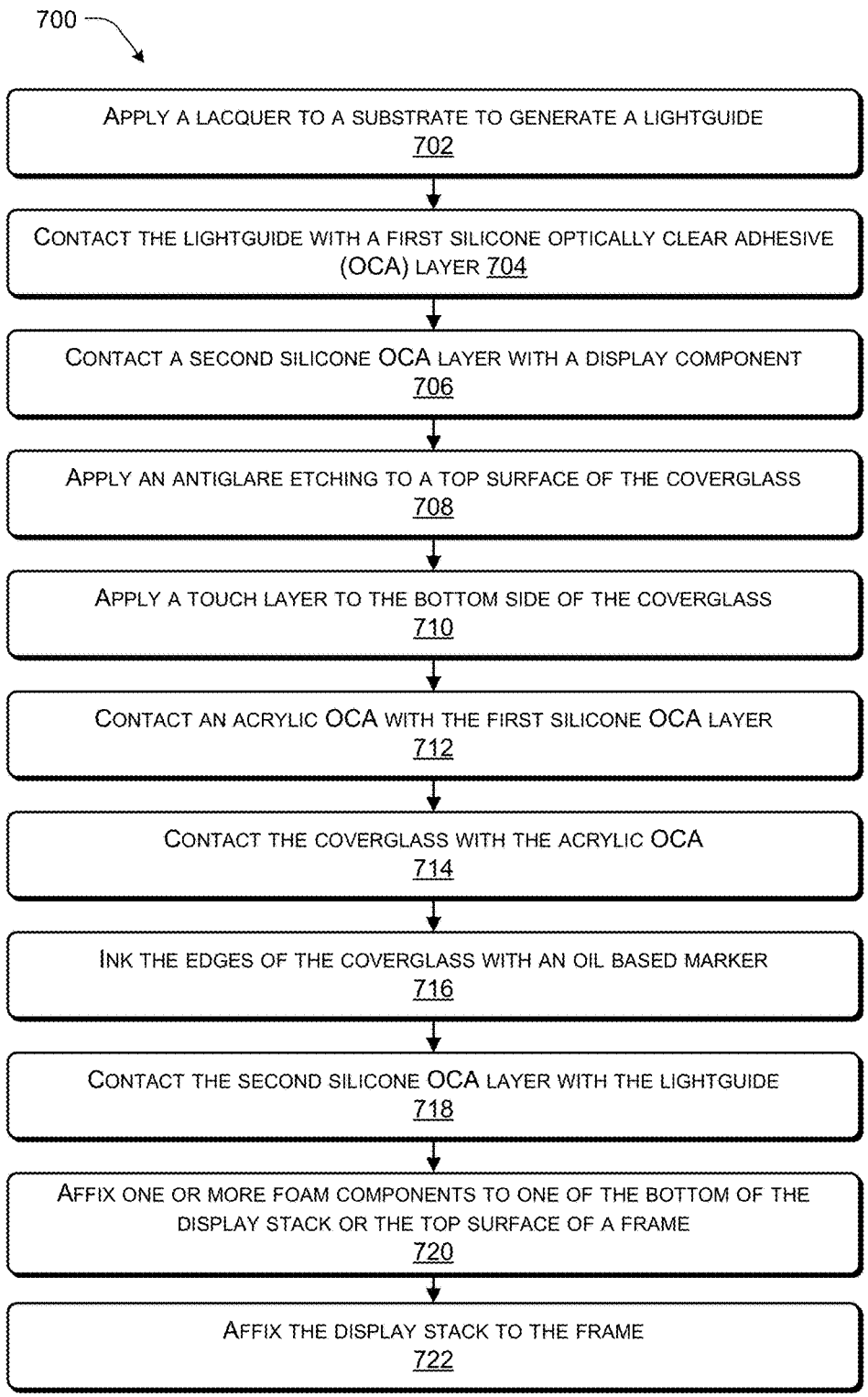
FIG. 7 illustrates an example flow diagram showing an illustrative process for forming the electronic devices of FIGS. 1-5.

FIG. 7 is a flow diagram illustrating example processes for generating a display stack as described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 7 illustrates an example flow diagram showing an illustrative process 700 for forming the display stack of FIGS. 1-3. For example, a display stack may include a cover component, a front light component, a display component, and/or one or more layers of OCA. At 702, a lacquer is applied to a substrate to generate a lightguide. For example, the lacquer may be applied to a PMMA plastic substrate, together with multiple grating elements that function to propagate light from the light source towards the top surface of the display stack. In some examples, the grating elements may be configured to stick out or extend outwards into the lacquer to form a positive relief. The lightguide may then be UV-cured or hardened.

At 704, the lightguide is contacted with a first layer of silicone OCA. The silicone OCA may be a film or a liquid. The first layer of silicone OCA may have a predetermined refractive index based at least in part on an amount and thickness of the OCA layer. For example, the silicone OCA may be may be substantially 150 um thick.

At 706, a second layer of silicone OCA is contacted with a display component. The second layer of silicone OCA may be cured or hardened to bond the display components into the display stack. For example, the OCA may be UV-cured on the corners and/or around the perimeter, as discussed above, or the silicone LOCA may be placed near a center and pressed outwards towards a perimeter of the display stack while UV-curing.

At 708, an antiglare material is applied to a top surface of a coverglass. For example, the top surface may be coated with a material having antiglare proprieties in addition to antireflective properties, anti-smudging or anti-fingerprinting properties, anti-cracking properties, among others that may be cooled or UV-cured. In other examples, an antiglare film may be adhered to the top surface of the coverglass. In some other examples, the antiglare layer may be formed be etched into the top surface of the coverglass using for example a chemical spray.

At 710, a touch layer is applied to the bottom surface of the coverglass. For example, the touch layer or touch pattern may be formed by depositing traces of ITO onto the bottom surface of the coverglass, printing a conductive ink onto the bottom surface of the coverglass, or adhering a pre-formed metal mesh or wiring to the bottom surface of the coverglass. In some specific examples, the touch layer may be formed by applying ITO to the coverglass using physical vapor deposition, electron beam evaporation, or sputter deposition techniques among others.

At 712, an acrylic OCA is contacted with the first layer of silicone OCA. For example, the acrylic OCA layer may have a predetermined UV or luminous transmittance rating and the silicone OCA may have a predetermined refractive index. In some implementations, both the acrylic OCA and the silicone OCA may be a SOCA or film. The SOCA may be die-cut to fit the dimensions associated with the display stack and the resulting OCA layer may be laminated using an auto glaze process to reduce bubbles that may form manufacturing defects.

At 714, the coverglass is contacted with the acrylic OCA. The acrylic OCA may be cured or hardened to bond the coverglass with the lightguide. For example, the OCA may be UV-cured on the corners and/or around the perimeter, as discussed above, or the silicone LOCA may be placed near a center and pressed outwards towards a perimeter of the display stack while UV-curing.

In another particular example, the acrylic OCA may be a film 100 micrometers (um) thick and the silicone OCA may be a LOCA that is 100 um thick. In the present example, the acrylic OCA film and the silicone LOCA may be applied in a vacuum under a pressure of 50 Pa or less for 20 to 30 seconds. By substituting a silicone LOCA for the OCA film, some manufacturing steps may be removed, such as the auto glaze process, as the number of bubbles that typically form between the OCA films may be reduced and/or eliminated when a LOCA is utilized. Thus, a display stack manufactured utilizing a silicone LOCA may be produced having better yields, reduced mechanical failures, and at a cheaper cost. For instance, when two OCA films are laminated particle bubbles (e.g., air gaps around particles or dust between the films) may form. These bubbles may result in device failure when the electronic device is exposed to heat, pressure, or a combination thereof, such as during stress testing. Thus, by substituting a LOCA for one of the OCA films, the number of defects and steps associated with the manufacturing process of the display stack may be reduced, resulting in a cheaper higher quality display.

At 716, the edges of the coverglass are inked using an oil based marker. The oil based mark is applied such that light being scattered as the light travels through the coverglass may be captured or contained by the oil based marker or ink to prevent the coverglass from acting as a lightguide.

At 718, the lightguide is contacted with the second layer of silicone OCA to bond the lightguide to the display component. Again, the OCA layer may be UV-cured or hardened to bond the display component and lightguide together. For example, the OCA may be UV-cured on the corners and/or around the perimeter. Thereafter, the remaining OCA may be UV-cured. By curing the corner(s) and/or perimeter, the techniques effectively create a barrier for the remaining OCA and also prevent the formation of air gaps in the OCA layer, thereby increasing the display stack. In other implementations, the silicone LOCA may be placed near a center and pressed outwards towards a perimeter of the display stack while UV-curing.

At 720, one or more foam component(s) are affixed to one of the bottom of the display stack or the top surface of a frame component of the electronic device. In some examples, the foam component(s) may be affixed with adhesives or other joining techniques. In other examples, the foam component(s) may be placed on the surface without adhesive and held in placed by friction resulting from the compression of the foam component(s) between the bottom of the display stack and the top surface of a frame.

At 722, the display stack is affixed to the frame of the electronic device. In some examples, such as those described above, portions of the bottom surface of the cover glass may be configured to be joined with portions of the frame. However, implementations are not so limited and other joining techniques may be used. For example, the frame may wrap over a top surface of the cover component to which it is bonded by adhesives. In some examples, the affixing of the frame of the electronic device to the display stack compresses the foam component(s). As discussed above, a reaction force is exerted by the compressed foam component(s) on the display stack which may reduce the risk of delamination of the layers of the display stack, for example, by reducing the interfacial stresses on the adhesives.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. An electronic device comprising;
   a display stack including:
      a coverglass with a top surface and a bottom surface, the top surface of the coverglass being etched to impart antiglare properties;
      a touch layer contacted with the bottom surface of the coverglass;
      a lightguide positioned beneath the coverglass and configured to receive light from a light source located adjacent to the lightguide;
      a first optically clear adhesive (OCA) layer disposed between the bottom surface of the coverglass and a top surface of the lightguide, the first OCA layer including an acrylic OCA with a predetermined luminous transmittance rating and a silicone OCA with a predefined refractive index;
      an electrophoretic display component positioned beneath the lightguide, the electrophoretic display component configured to display content;
      a second OCA layer disposed between the lightguide and the electrophoretic display component; and
      a ring adhesive disposed around an outer edge of the display stack, the ring adhesive extending from the top surface of the coverglass downward to a bottom surface of the lightguide;
   a midframe disposed below the display stack; and
   one or more elastically deformable foam components disposed between at least a portion of a bottom surface of the display stack and corresponding portions of a top surface of the midframe.

2. The electronic device as recited in claim 1, wherein the one or more foam components are in a compressed state and are configured to exert an upward pressure on the portion of the bottom surface of the display stack.

3. The electronic device as recited in claim 1, wherein the display stack is substantially rectangular in shape and the one or more foam components include a plurality of foam components that are disposed proximate corresponding corner portions of the bottom surface of the display stack.

4. The electronic device as recited in claim 1, wherein the one or more foam components are dimensioned and placed such that an outside perimeter of individual foam components substantially corresponds with an outside perimeter of the bottom surface of the display stack.

5. A display stack of an electronic device, the display stack comprising:
    a cover component, the cover component including:
        a coverglass;
        a first black mask extending from an outside edge of the display stack to a first location beneath the coverglass; and
        a second black mask extending from the outside edge of the display stack to a second location beneath the coverglass, the second black mask arranged below the first black mask, and the first black mask being closer to an edge of the touch layer than the second black mask;
    a first optically clear adhesive (OCA) layer contacted to a bottom surface of the cover component;
    a second OCA layer contacted to the first OCA layer;
    a front light component positioned beneath the second OCA layer;
    a third OCA layer contacted to a bottom surface of the front light component;
    a display component positioned beneath the third OCA layer, the display component including at least a display and a substrate; and
    one or more foam components positioned beneath the display component,
    wherein at least a portion of a foam component of the one or more foam components that is positioned between the display component and a frame component of the electronic device is in contact with the substrate and the frame component.

6. The display stack as recited in claim 5, wherein the display stack is substantially rectangular in shape and the one or more foam components include a plurality of foam components that are disposed proximate corresponding corner portions of a bottom surface of the display stack.

7. The display stack as recited in claim 5, wherein the one or more foam components comprise one or more of acrylic, urethane, polyethylene, and polypropylene.

8. The display stack as recited in claim 5, wherein the one or more foam components comprise a cellular membrane structure with voids, the cellular membrane structure being one of closed cell, semi-closed cell, or open cell.

9. The display stack as recited in claim 5, wherein the front light component includes:
    a light source; and
    a lightguide to propagate light generated by the light source.

10. The display stack as recited in claim 5, wherein:
    the coverglass includes a top surface and a bottom surface, the top surface of the coverglass being etched to impart antiglare properties; and
    the cover component further includes at least one touch layer contacted with the bottom surface of the coverglass.

11. The display stack as recited in claim 10, wherein the cover component includes an oil based ink disposed around an edge of the coverglass.

12. The display stack as recited in claim 5, further comprising a ring adhesive disposed around an outer edge of the display stack and extending downward to a bottom surface of the front light component.

13. The display stack as recited in claim 5, wherein the display is a front plane laminate, the front plane laminate being disposed on the substrate.

14. The display stack as recited in claim 5, wherein an entirety of the foam component is positioned between the display component and the frame component.

15. An electronic device comprising:
    a display stack comprising:
        a coverglass;
        a first black mask extending from an outside edge of the display stack to a first location beneath the coverglass;
        a second black mask extending from the outside edge of the display stack to a second location beneath the coverglass, the second black mask arranged below the first black mask, and the first black mask being closer to an edge of the touch layer than the second black mask;
        a first optically clear adhesive (OCA) layer contacted to a bottom surface of the coverglass;
        a second OCA layer contacted to the first OCA layer;
        a front light component positioned beneath the second OCA layer;
        a third OCA layer contacted to a bottom surface of the front light component; and
        a display component positioned beneath the third OCA layer, the display component including at least a display and a substrate;
    a frame component; and
    one or more foam components compressed between the display stack and the frame component, wherein an entirety of at least a foam component of the one or more foam components is positioned between a bottom surface of the substrate and a top surface of the frame component.

16. The electronic device as recited in claim 15, wherein the display stack is substantially rectangular in shape and the one or more foam components include a plurality of foam components that are positioned proximate corresponding corner portions of the bottom surface of the display component.

17. The electronic device as recited in claim 15, wherein:
    the coverglass includes a top surface and a bottom surface, the top surface of the coverglass being etched to impart antiglare properties; and
    the display stack further comprises at least one touch layer contacted with the bottom surface of the coverglass.

18. The electronic device as recited in claim 15, wherein the front light component includes:
    a light source; and
    a lightguide to propagate light generated by the light source.

19. The electronic device as recited in claim 15, wherein the one or more foam components fill a gap between the display component and the frame component.

20. A display stack of an electronic device, the display stack comprising:

a coverglass with a top surface and a bottom surface, the top surface of the coverglass being etched to impart antiglare properties;

at least one touch layer contacted with the bottom surface of the coverglass;

a first black mask extending from an outside edge of the display stack to a first location beneath the coverglass;

a second black mask extending from the outside edge of the display stack to a second location beneath the coverglass, the second black mask arranged below the first black mask, and the first black mask being closer to an edge of the touch layer than the second black mask;

a first optically clear adhesive (OCA) layer contacted to a bottom surface of the touch layer;

a second OCA layer contacted to the first OCA layer;

a front light component positioned beneath the second OCA layer;

a third OCA layer contacted to a bottom surface of the front light component; and a display component positioned beneath the third OCA layer.

21. The display stack as recited in claim 20, further comprising one or more foam components positioned beneath the display component.

22. The display stack as recited in claim 21, wherein the display stack is substantially rectangular in shape and the one or more foam components include a plurality of foam components that are disposed proximate corresponding corner portions of a bottom surface of the display stack.

23. The display stack as recited in claim 21, wherein the one or more foam components comprise a cellular membrane structure with voids, the cellular membrane structure being one of closed cell, semi-closed cell, or open cell.

24. The display stack as recited in claim 20, further comprising a ring adhesive disposed around an outer edge of the display stack and extending downward to a bottom surface of the front light component.

\* \* \* \* \*